US006449940B2

(12) United States Patent
Nagel

(10) Patent No.: US 6,449,940 B2
(45) Date of Patent: Sep. 17, 2002

(54) INTERNAL COMBUSTION ENGINE

(76) Inventor: Edmund F. Nagel, Reichsstrasse 82, A-6800 Feldkirch (AT)

( * ) Notice: Subject to any disclaimer, the term of this patent is extended or adjusted under 35 U.S.C. 154(b) by 0 days.

(21) Appl. No.: 09/748,893

(22) Filed: Dec. 26, 2000

(30) Foreign Application Priority Data

Dec. 27, 1999 (AT) ............................................. 2187/99

(51) Int. Cl.[7] ................................................ F02C 3/00

(52) U.S. Cl. ................. 60/39.63; 123/45 R; 123/197.4; 123/197.3; 123/197.1; 123/78 F; 123/74; 123/55

(58) Field of Search ............................ 123/45 R, 197.4, 123/197.3, 78 F, 197.1; 74/55; 60/39.63

(56) References Cited

U.S. PATENT DOCUMENTS 947,226 A * 1/1910 Dorffel .......................... 74/55
1,604,625 A 10/1926 Wickersham et al.
1,648,780 A * 11/1927 Nuesell ......................... 74/55
1,728,363 A * 9/1929 Rightenour ............... 123/78 F
1,790,198 A * 1/1931 Cizek ............................ 74/55
2,340,010 A * 1/1944 Miller ........................... 74/55
3,034,363 A * 5/1962 Vogel ............................ 74/55
3,687,117 A * 8/1972 Panariti ................... 123/197.1
4,653,438 A * 3/1987 Russell ...................... 123/44 B
5,553,574 A * 9/1996 Duncalf ................... 123/197.3
5,813,372 A 9/1998 Manthey

FOREIGN PATENT DOCUMENTS

DE 32 14 516 10/1983
EP 0 957 250 11/1999 ................ 60/39.63
GB 262429 7/1927

* cited by examiner

*Primary Examiner*—Thomas Denion
*Assistant Examiner*—T B Trieu
(74) *Attorney, Agent, or Firm*—Reed Smith LLP

(57) ABSTRACT

The internal combustion engine comprises at least one combustion chamber for burning a fuel in timed explosions accompanied by formation of a combustion gas, at least one expansion chamber which is connected with the combustion chamber and separate from the combustion chamber and which has a piston for converting energy of the combustion gas into mechanical energy or work, and a cam gear unit by which a drive shaft can be driven by the piston and which has a cam disk and associated thrust member, wherein the thrust member can be lifted from the cam disk for carrying out irregular engine cycles independent from a continuous rotation of the cam disk, including a pausing of the piston of the expansion chamber at its top dead center.

26 Claims, 3 Drawing Sheets

INTERNAL COMBUSTION ENGINE

BACKGROUND OF THE INVENTION

1. Field of the Invention

The invention is directed to an internal combustion engine with at least one combustion chamber for burning a fuel in timed explosions accompanied by formation of a combustion gas, wherein the combustion chamber is connected with at least one expansion chamber which is separate from the combustion chamber and which has a piston for converting energy of the combustion gas into mechanical energy or work. Further, the invention is directed to a method for operating an internal combustion engine of this type.

2. Description of the Related Art

An engine of the kind mentioned above is known from EP 957 250 A2. The advantage of an engine of this type with separate combustion chamber and expansion chamber is that the conditions for the combustion of the fuel and for the expansion of the combustion gas formed during combustion can be predetermined independently from one another, so that a high degree of efficiency can be achieved. A further improvement in efficiency compared with conventional two-stroke, four-stroke or diesel engines is achieved in this known engine in that, for each explosion stroke, the combustion chamber is filled with a constant, optimal charge of combustible mixture. To control the power output of the engine, the charging of the combustion chamber is not changed; rather, idle strokes are also inserted between working strokes in which the combustible mixture is ignited in the combustion chamber. There is no ignition of the mixture in these idle strokes; the mixture remains unburned in the combustion chamber. In order to make it possible to transmit the drive output of an engine controlled in this manner to a drive shaft, for example, of a wheel in a motor vehicle, relatively complicated steps are necessary in EP 957 250 A2. In an embodiment example, the piston of the expansion chamber is connected with a connecting rod which drives the drive shaft via an automatic transmission which is controlled in accordance with the required output and the required torque. In this regard, there is considerable expenditure on control and, moreover, lateral forces are exerted on the piston by the crankshaft, so that oil lubrication of the piston is required. In another embodiment example in EP 957 250 A2, the piston of the expansion chamber advantageously remains in an idle stroke at its top dead center. A hydraulic transmission device which, again, is relatively complicated is necessary for transmitting the drive output.

OBJECT AND SUMMARY OF THE INVENTION

It is the primary object of the invention to enable simplified transmission of the output of the piston of the expansion chamber to a drive shaft in an internal combustion engine of the type mentioned in the beginning, wherein idle strokes or stroke pauses in which the piston of the expansion chamber remains in its top dead center can be inserted in addition to working strokes in order to control the engine (preferably with constant loading of the combustion chamber) such that efficiency is optimized. This highly complex problem is solved according to the invention in a surprisingly simple manner in that a drive shaft can be driven by the piston of the expansion chamber via a cam drive or cam gear unit having a cam disk and associated thrust member, wherein the thrust member can be lifted from the cam disk for implementing irregular engine cycles independent from a continuous rotation of the cam disk, including a pausing of the piston of the expansion chamber at its top dead center.

Cam gear units have a cam disk with a correspondingly shaped circumferential contour and (as driving or driven element) a thrust member contacting the cam disk. A cam gear unit of this kind enables a simple separation of the piston of the expansion chamber from the drive shaft during an idle stroke or stroke pause when a running face of a cam disk is provided for the thrust member only on one side and the thrust member remains raised from the cam disk during the idle stroke or stroke pause. The thrust member is advantageously formed by the free end of the piston rod which, for this purpose, is advantageously constructed as a roller tappet acting on a cam disk arranged at the drive shaft. The use of a cam disk also makes it possible to operate the internal combustion engine without oil lubrication for the piston (as will be explained in more detail).

For internal combustion engines which do not belong to the generic type because they do not have an expansion chamber that is separate from a combustion chamber but, rather, have a work piston that is arranged directly in the combustion chamber, the use of special cam gear units has already been suggested in particular, for example, in U.S. Pat. No. 5,813,372. However, this cam gear unit is used for other purposes and not to make it possible to add idle strokes between two explosion strokes; idle strokes of this type cannot be carried out at all in this kind of engine. Further, in these internal combustion engines, the thrust members of the cam gear units are positively guided because of the cam disks acting on both sides of the thrust members and it is not possible to raise the thrust member from the cam disk. Since a separate compression stroke must be carried out in these engines, this positive guiding of the thrust rod is required.

In a preferred embodiment example of the invention, a precompressor device which is separated from the combustion chamber is provided for precompression of air to be introduced into the combustion chamber. Using separate precompressor devices in this way in timed internal combustion engines is already known, for example, from DE 32 14 516 A1. In a particularly preferred embodiment example, the piston rod of the piston of the precompressor device is connected with the piston of the expansion chamber by a shared piston rod.

Further, at least one injection nozzle opening into the expansion chamber is advantageously provided for injecting a coolant liquid to introduce an implosion stroke following the explosion stroke. The energy inherent in the combustion gas can be better exploited by an implosion stroke of this kind so that a further increase in efficiency is achieved. The energy guided off in the implosion stroke is advantageously utilized for precompression by transmission to the precompressor device.

Further advantages and details of the invention are explained in the following with reference to an embodiment example of the invention shown in the drawing.

DESCRIPTION OF THE PREFERRED EMBODIMENTS

Figure 1:
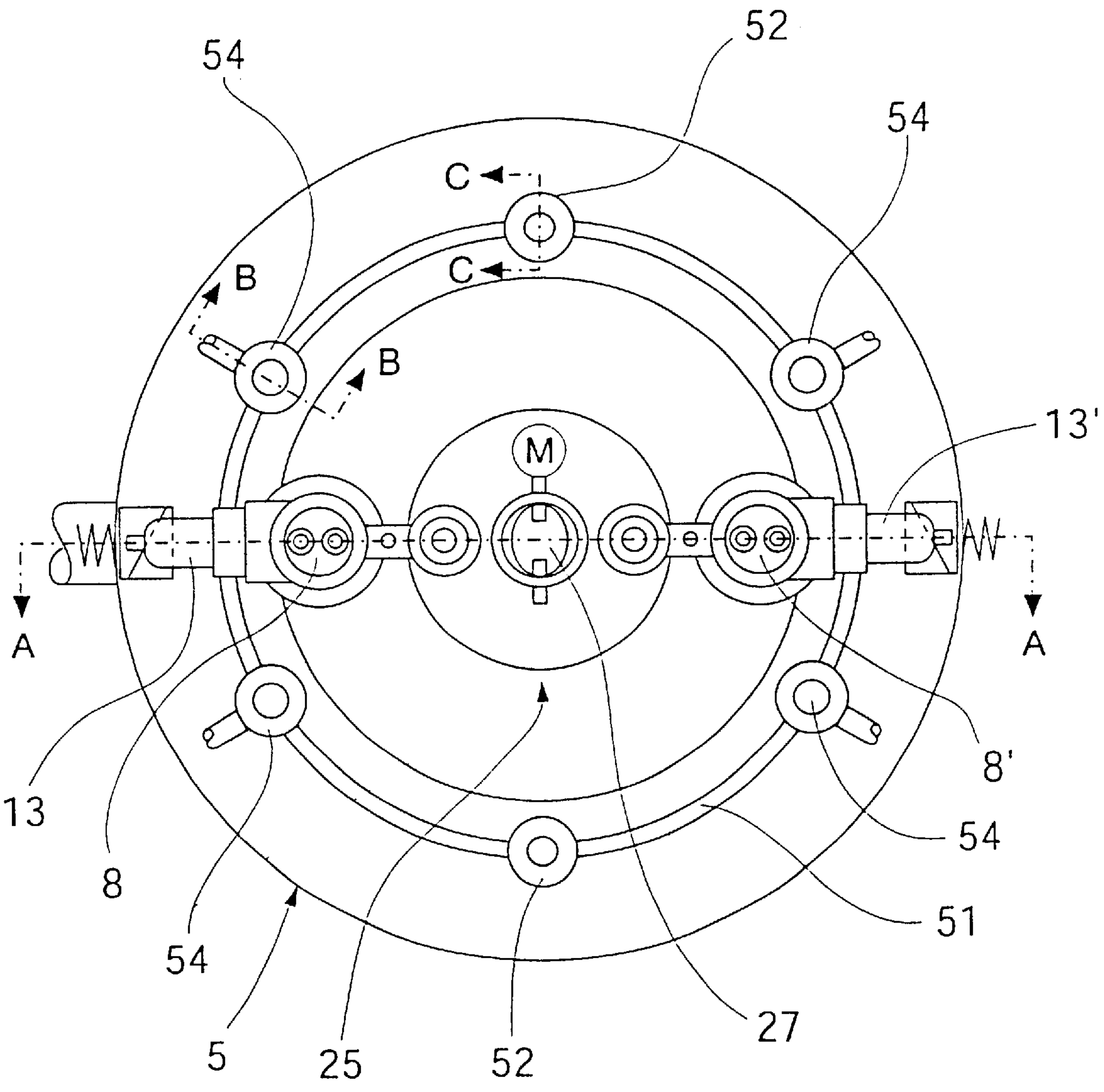
FIG. 1 shows a schematic top view of an internal combustion engine according to the invention.
Figure 2:
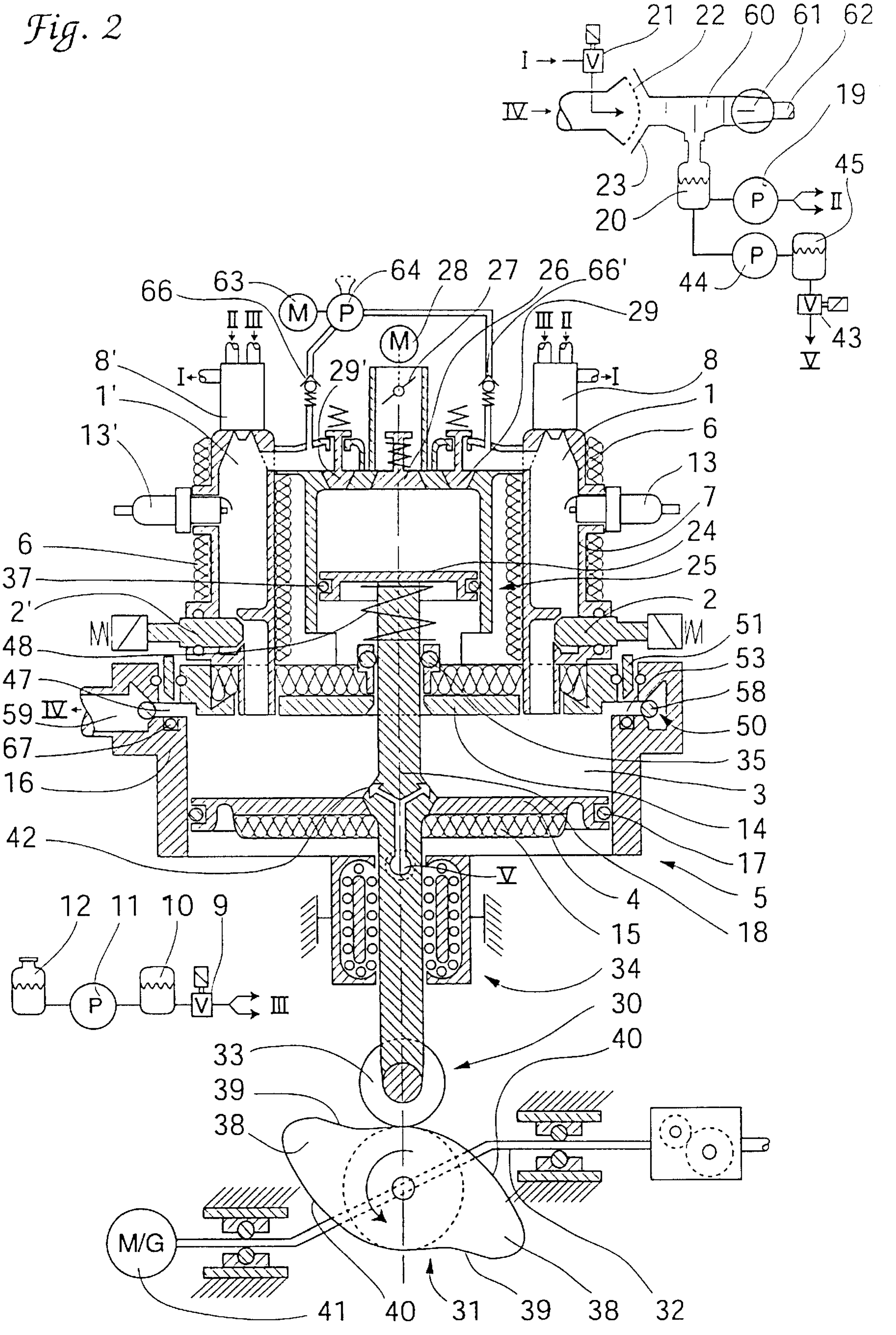
FIG. 2 shows a section along line A—A of FIG. 1.
Figure 3:
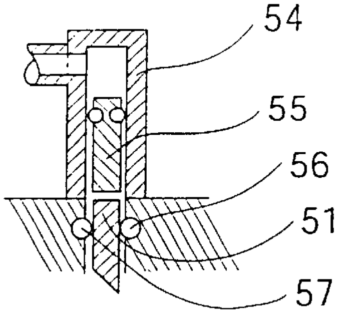
FIG. 3 shows a partial section along line B—B of FIG. 1.

The embodiment example of an internal combustion engine according to the invention which is shown schematically has combustion chambers 1, 1' which are connected, via controllable internal combustion chamber outlet valves 2, 2', with an expansion chamber 3 which is formed by the cylinder space of a piston-cylinder unit 5 having a piston 4. An internal combustion engine according to the invention can also have a plurality of expansion chambers which are connected with one or more combustion chambers.

The combustion chambers 1, 1' are surrounded by thermal insulation 6 in order to prevent heat radiation from the walls 7 of the combustion chambers 1, 1' as far as possible. Therefore, in continuous operation of the internal combustion engine the walls 7 of the combustion chambers 1, 1' are heated to very high temperatures above 700° C. The thermal insulation of the combustion chambers could also be carried out in that the combustion chambers themselves are made from a thermally insulating material of corresponding thickness, for example, a ceramic. The fuel is injected directly into the combustion chambers 1, 1'. For this purpose, double nozzles 8, 8' are provided and are used not only to inject fuel but also serve to inject water. The spray characteristic of the double nozzles 8, 8' is such that the fuel fans out so that the walls 7 of the combustion chambers 1, 1 are wetted by fuel as well as possible and over the greatest possible area when fuel is injected. An electromagnetic switching valve 9 is provided for controlling the fuel injection, and a pressure accumulator 10 for fuel in the form of an air vessel which is acted upon by a fuel pump 11 which, in turn, conveys fuel from a tank 12 is connected to this electromagnetic switching valve 9. The reference switching time for the electromagnetic switching valve 9 is in the range of one millisecond. Such electromagnetic switching valves are known in motor vehicles (for example, K-Jettronic or Common Rail).

Spark plugs 13, 13' are provided for cold-starting the internal combustion engine. As soon as the walls 7 of the combustion chambers 1, 1' are sufficiently heated and autoignition of the injected fuel occurs (at temperatures over approximately 600° C.), the spark plugs 13, 13' are no longer fired. Because of its autoignition, the fuel is finely atomized by the injection nozzles at high pressure and introduced into the combustion chamber only at the moment of ignition. When the individual fuel droplets impinge, they ignite at the burner walls with flame centers around each individual droplet.

Because of the flame center occurring around each individual droplet as a result of the multiple surface ignitions, there is a pronounced knock of the engine, i.e., the combustion proceeds with extreme turbulence and at high speed. In contrast to conventional internal combustion engines in which this effect is extremely undesirable (prevention through antiknock agent and limited compression ratios), this type of combustion is very advantageous in the engine according to the invention since, in particular, the turbulence of the combustion with supersonic gas eddies leads to an intensive mixing of the mixture during burnup. This already makes possible air factors of lambda 1.05 for approximately CO-free and HC-free burnup, wherein values far below the exhaust gas value of an Otto engine with catalytic converter can be achieved. Due to the fact that the gas transfer caused by pressure is faster than the flame speed during bumup, the combustion chamber outlet valve 2 remains closed until complete combustion of the mixture because otherwise unburned mixture reaches the work chamber 3 and no longer ignites therein.

In order to minimize thermal losses in the piston-cylinder unit 5 also as far as possible, the insulation 6 also extends over the cylinder head 14. In addition, the piston 4 is provided with insulation 15. Only the cylinder wall 16 is not thermally insulated in order to prevent excessive thermal loading of the piston seal 17. This piston seal 17 is made of plastic, preferably graphite-Teflon, which is resistant to continuous temperatures up to approximately 250° C. This seal 17 is water-lubricated and one or more coolant water spray nozzles which are arranged in the piston rod 18 and whose function will be described more exactly in the following cause an additional cooling and a lubrication of the piston seal 17.

In order to reduce NOx emission of the internal combustion engine, water is injected into the combustion chambers 1, 1' along with the fuel during the explosion stroke. This water injection is likewise carried out via double nozzles 8, 8'. For this purpose, each of the double nozzles 8, 8' has a central inner nozzle for injecting the fuel and an outer nozzle which surrounds this inner nozzle annularly for injection of water. The nozzle opening of the inner fuel nozzle and the nozzle opening of the water nozzle are closed in pressureless state and only open when these nozzles are acted upon by a high pressure such as is known in conventional diesel nozzles. At its circumferential wall, the outer water nozzle has a water inlet and a water outlet located opposite to the latter, wherein coolant water flows through this water nozzle also in the closed state of its nozzle opening, so that the inner fuel nozzle is also cooled and no fuel can evaporate when the walls 7 of the combustion chambers 1, 1' are hot but no explosion stroke is carried out and the engine is at rest. The flow of water through the outer water nozzle of the double nozzle 8, 8' is caused by the pump 19 which pumps water from a storage vessel 20. An electromagnetic valve 21 is provided in the return of the outer water nozzle of the double nozzle 8, 8'. As soon as this is closed, a pressure builds up in the outer water nozzle of the double nozzle 8, 8' and water is injected into the combustion chamber 1, 1'. When the valve 21 is open, the water flows back to the storage vessel 20 via the spray head 22 and the air intake head 23 whose function will be described in more detail in the following.

The piston 4 of the expansion chamber 3 is connected with a precompressor device which is formed by a piston-cylinder unit 25. The piston 24 of this piston-cylinder unit and the piston 4 of the expansion chamber 3 have a shared piston rod 18. During a downward movement of the piston 4 which is transmitted via the piston rod 18 to a downward movement of the piston 24, air is sucked into the cylinder space of the piston-cylinder unit 25 via the check valve 26. The quantity of air sucked in before reaching the bottom dead center of the piston 4 can be changed by means of the throttle 27 which is adjustable via the actuating motor 28. In a subsequent upward movement of piston 4 and piston 24 of the precompressor unit, which piston 24 is connected to piston 4, the sucked in air is pressed into the combustion chambers 1, 1' via the check valves and is precompressed therein.

The energy of the hot combustion gas which is formed in the combustion chambers 1, 1' and which drives the piston 4 in the expansion chamber 3 is converted into mechanical energy of the drive shaft 32 by means of a cam gear unit 31 which can be driven by the piston 4. The thrust member 30 of the cam gear unit is formed by the free end of the piston rod 18 of the piston 4 which, in the present embodiment example, forms the shared piston rod of the piston 4 of the expansion chamber and of the piston 24 of the precompressor unit. The thrust member 30 is constructed as a roller tappet, wherein a wheel or a roller 33 is rotatably mounted via a ball bearing at the free end of the piston rod 18. The thrust member 30 acts on a cam disk 31 arranged at the drive shaft 32 and the piston rod 18 is mounted outside the piston-cylinder unit 5 in a rolling bearing 34 which also receives the lateral forces exerted on the thrust member 30. Accordingly, no important lateral forces are exerted on the upper part of the piston rod 18 and on the pistons 4 and 24 arranged at the latter, and simple O-shaped plastic seals 35, 17, 37 are sufficient for additional supporting and sealing of these parts. Oil lubrication of these parts is not required.

In the shown embodiment example, the cam disk 31 has two symmetrically formed cams 38 along its circumference. The part of the cam disk 31 contacting the roller 33 during the downward movement of the piston 4 forms a first running surface 39 of the cam disk 31. Further, a second running surface 40 is preferably provided at the cam disk 31 from which the piston 4 can be restored to its top dead center. However, as will be described below, the force exerted on the piston 4 and piston 24, respectively, via the second running surface 40 and thrust member 30 is reinforced in the present embodiment example of the invention by the force acting on the piston 4 in the implosion stroke and can even be replaced by it.

A work cycle of the embodiment example of an internal combustion engine according to the invention will be described more exactly in the following:

In continuous operation of the internal combustion engine, during which the walls 7 of the combustion chambers 1, 1' have a high temperature, as was described, the ignition of the fuel injected into the combustion chambers 1, 1' which are charged with fresh air is carried out by autoignition at the walls 7. The spark plugs 13, 13' are utilized for ignition only in the startup phase. The injection and ignition of the fuel is carried out at a point in time shortly before the first running surface 39 reaches the roller 33. During the next millisecond, the combustion spreads in the combustion chambers 1, 1' and is essentially concluded when the tip of the cam 38 or the start of the running surface 39 reaches the roller 33. The time period required for complete combustion depends, among other things, on the utilized fuel, the precompression of the fresh air in the combustion chambers 1, 1' and the burner shape and is, for example, about 3 milliseconds. Accordingly, in order to determine the correct injection and ignition times, the speed and the angular position of the shaft 32 must be determined by suitable sensors. Before the internal combustion engine is started, the cam disk 31 is brought into a position by the electric motor 41 so that the roller 33 contacts precisely the start of the first running surface 39 in order to ensure the correct rotating direction of the drive shaft 32 when starting. After the start of the internal combustion engine, the electric motor 41 acts as a generator for supplying energy to the electric components of the vehicle and for charging the vehicle battery.

In addition to injecting water into the combustion chambers 1, 1' during the explosion stroke together with the fuel for reducing NOx emissions, as was already mentioned, additional water is preferably sprayed into the combustion chambers 1, 1' after complete burnup of the water-fuel mixture at about 1500° C. for further reduction of the temperature of the combustion gas. Accordingly, the temperature of the hot combustion gas is additionally reduced to below 1000° C., preferably to below 900° C.; however, the required temperature of the walls 7 of the combustion chambers 1, 1' is retained for autoignition of the fuel. Therefore, no change in exergy occurs in the hot combustion gas. But after the expansion, described below, of the gas-vapor mixture in the expansion chamber 3 accompanied by performance of mechanical work, this gas-vapor mixture only has temperatures of less than 300° C. Accordingly, all seals can be formed of maintenance-free plastic and maintenance-intensive stop seals can be dispensed with.

When the roller 33 contacts the start of the running surface 39 and the combustion in the combustion chambers 1, 1' is essentially completely terminated, the combustion chamber outlet valves 2, 2' are opened and the hot combustion gas which is under pressure flows into the expansion chamber 3 and propels the piston 4 downward. The piston performs work against the drive shaft 32 via the cam gear 30, 31. By suitable selection of the quantity of injected fuel and precompressed fresh air and with corresponding dimensioning of the combustion chambers 1, 1' in relation to the expansion chamber 3, the combustion gas has expanded to roughly atmospheric pressure when the piston 4 has reached the bottom dead center UT. The volume of the expansion chamber 3 is essentially greater than, preferably more than twenty-times greater than, the total volume of combustion chambers 1, 1' communicating with the expansion chamber 3.

The hot combustion gas preferably flows out of the combustion chambers 1, 1' into the expansion chamber 3 so as to be throttled. For this purpose, the combustion chamber outlet valves 2, 2' are opened gradually rather than suddenly with maximum speed. The line cross sections between the combustion chambers 1, 1' and the expansion chamber 3 can also be relatively small. The advantage in the hot combustion gases flowing out in a throttled manner is the reduced pressure peaks acting on the piston 4 and all parts connected therewith. Since the throttling constitutes a rubbing of the gas, this results in heating of the gas. This increase in the temperature of the expansion gas leads to an increase in its volume and pressure. However, this gas has not yet performed work in the internal combustion engine according to the invention when flowing out of the combustion chambers 1, 1', so that the exergy of the gas is not changed by this throttling effect, i.e., no losses occur.

The explosion stroke is accordingly terminated and an implosion stroke is subsequently introduced in the present embodiment example of the invention, during which implosion stroke the combustion chambers 1, 1' are scavenged and refilled and precompression is carried out. For this purpose, the cooling water injection nozzles 42 (a plurality of injection nozzles arranged annularly along the circumference of the piston rod 18 or an individual annular injection nozzle) are triggered by the actuation of the electromagnetic valve 43. The cooling water injection nozzles 42 are fed from a pressure accumulator 45 in the form of an air vessel which is acted upon by a pump 44. The pump 44 draws its water from the storage vessel 20 which was already mentioned. The coolant water is sprayed in under high pressure, wherein the spray water jet is fanned out in the circumferential direction of the cylinder wall 16 and is oriented upward at an acute angle relative to the piston 4. Excess coolant water encountering the cylinder wall 16 can accordingly exit in the circumferentially extending water collecting groove 47. Due to the fact that coolant liquid is sprayed in, the temperature of the hot explosion gas is reduced suddenly and an underpressure or negative pressure is built up, wherein the pressure in the expansion chamber is approximately 0.2 bar at the start of the implosion stroke. Because of this negative pressure, the piston 4 is pulled upward in the direction of the top dead center OT. The force exerted on it is transmitted via the piston rod 35 to the piston 24 of the precompressor device. The piston 24 moving upward presses the fresh air stored in the cylinder space of the piston-cylinder unit 25 into the combustion chambers 1, 1 ' via the check valves 29, 29', so that the combustion gas is initially purged from the latter and is replaced by fresh air. At the conclusion of the charge exchange, which is also assisted by the negative pressure in the expansion chamber 3, the combustion chamber outlet valves 2, 2' are closed and increased pressure is subsequently built up in the combustion chambers 1, 1'. This pressure preferably ranges between 5 bar and 15 bar and is particularly preferably between 7 bar and 11 bar.

The spraying in of coolant liquid via the injection nozzles 42 is carried out only in the first phase of the upward movement of the piston 4 and is stopped before the injected coolant liquid would impinge on the hot cylinder head 14. The injected coolant liquid also serves to cool the cylinder wall 16 and to lubricate the piston seal 36.

A spring 48 which pretensions the piston 24 in the direction of its top dead center and is tensioned during the explosion stroke can be provided to reinforce the force exerted on the piston 24 of the precompressor unit by the implosion of the hot combustion gas. The quantity of fresh air with which the piston-cylinder unit 25 is charged during the explosion stroke and which is subsequently pressed into the combustion chambers 1, 1' is controlled by the choke 27. In this embodiment example, in which the piston 24 is pretensioned via the spring 48, the thrust member 30 is normally lifted from the respective second running surface 40 at the cam disk 31 during the implosion stroke. Corresponding to the movement of the piston 4 from the top dead center to the bottom dead center which is faster in the explosion stroke than in the implosion stroke because of the negative pressure from the bottom dead center to the top dead center, the first running surface 39 of the cam disk 31 extends over about 40° to 70° of the circumference of the cam disk, while the second running surface 40 extends over about 110° to 140°. This second running surface 40 is provided here only as a safety device in case no cooling liquid is injected for triggering an implosion stroke due to a fault. The return speed of the piston 24 is measured electronically to regulate the throttle 27. It must be ensured that piston 24 or piston 4 has been braked precisely to a speed of zero up to the top dead center and, on the other hand, that piston 24 or piston 4 has just reached the top dead center. If an air cushion remained in the cylinder space of the piston-cylinder unit 25, this would exert a downwardly directed force on this piston 24 immediately at the conclusion of the upward movement of the piston 24, i.e., in some cases before the opening of the combustion chamber outlet valves 2, 2' in the subsequent explosion stroke.

In order to minimize the time for damaging heat losses due to convection, the first running surface 39, 39' is constructed more steeply than the second running surface 40, 40'.

Figure 5:
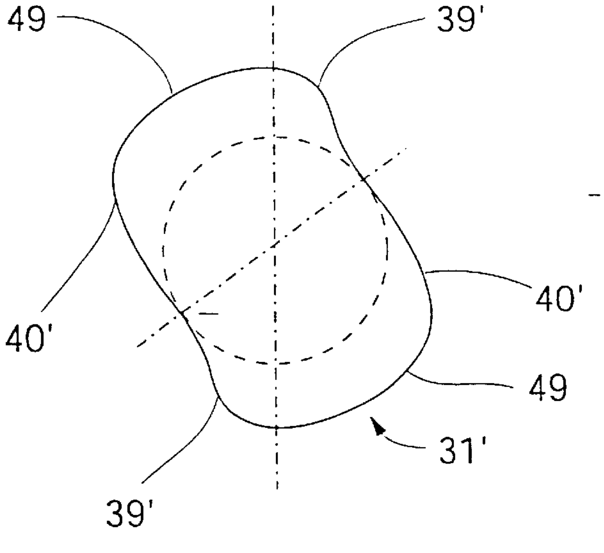
FIG. 5 shows a schematic view of a cam disk of the cam gear unit.

Alternatively, however, the spring 48 can also be dispensed with. In this case, the upward movement of the piston 24 is reinforced by the cam disk 31 according to the standard. A cam disk 31' constructed in a manner corresponding to FIG. 5 is preferred for this purpose. In this case, two cams, each with a first and second running surface 39', 40', are provided. The first running surface 39' again has an angular range of approximately 40° to 70° of the circumference of the cam disk, while the angular range of the second running surface 40' is somewhere between 50° and 80°. The piston 4 or piston 24 is accordingly guided back in a positive or compulsory manner from the bottom dead center UT to the top dead center OT, wherein this process is still, as before, reinforced by the force exerted on the piston 4 by means of the implosion. In order to prevent the connecting rod 30 from lifting off the running surface 40' at low rotational speeds also (for example, at speeds below 30 km/h in motor vehicles), the injection of the coolant water is carried out in a throttled manner at these slow rotational speeds, so that the negative pressure forming in the implosion stroke is built up more gradually. The precompression pressure selected in this case is high enough to brake the return of the piston 24 also at the maximum speed of the engine to the top dead center to zero. Accordingly, there is no longer a need for electronic measurement of the return speed or the associated regulating element in the form of the choke 27. In the cam disk in FIG. 5, there is a larger area 49 with constant radius between the successive running surfaces 40' and 39' in which the pistons 4 and 24 are at their top dead centers, so that the ignition time for the combustion chambers 1, 1' receives a certain tolerance period and, in particular, a sufficient period of time is provided for complete adiabatic burnup of the mixture in the combustion chambers 1, 1'. The pause at the top dead center OT can be adjusted over the length of the area 49 depending on the combustion velocity of the utilized fuel.

In principle, it would be conceivable and possible to omit entirely an injection of coolant water for triggering an implosion stroke, wherein pistons 4 and 24 are displaced from their bottom dead center to the top dead center exclusively by the force exerted on the thrust member 30 via the running surface 40, 40' of the cam disk 31, 31'. Naturally, a certain reduction in efficiency of the internal combustion engine is accordingly taken into account.

Figure 4:
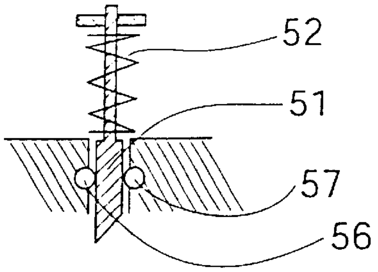
FIG. 4 shows a partial section along line C—C of FIG. 1.

On its path from the bottom dead center to the top dead center, the piston 4 of the expansion chamber 3 further compresses the combustion gas which is located in the expansion chamber 3 and which is initially under negative pressure in case coolant liquid is sprayed in. During the movement of the piston 4 from its bottom dead center to the top dead center, the ring 51 of the expansion chamber outlet valve is displaced upward. For this purpose, a plurality of restoring springs 52 acting upward on the ring 51 are provided at the top of the cylinder head 41 along the circumference of the ring 51 (see FIG. 4). These restoring springs 52 pull the ring 51 into its upper position in which an annular outlet channel 53 is released when the tappets 55 arranged in the hydraulic cylinders 54 are not under pressure load by the hydraulic liquid. A plurality of hydraulic cylinders 54 are likewise arranged on the top side of the cylinder head 14 along the circumference of the ring 51. O-rings 56, 57 which run alongside the ring 51 are used to seal the ring 51. The seal 67 is provided for sealing the outlet channel 53 in the bottom position of the ring 51. The ring 51 has a wedge-shaped taper at its lower edge to increase the sealing pressure.

When the ring 51 is displaced into its upper position releasing the outlet channel 53, the expansion chamber outlet valve 50 is still closed by the O-ring 58 which surrounds the outlet channel 53 on the outer side and forms a check valve. When the pressure in the expansion chamber 3 has increased above atmospheric pressure during the upward movement of the piston 4 in the direction of the top dead center, the O-ring 59 releases the outlet channel 53 and the cooled combustion gas, together with the coolant liquid contained therein, is pressed out in the exhaust pipe line 59. The exhaust gas-steam mixture is pressed into the spray head 22 through which it is sprayed into the air intake funnel 23. In so doing, the exhaust gas-steam mixture is mixed with surrounding air by a factor of 1:10 to 1:25 and is suddenly cooled to about 30° C. The cooled water precipitates in the precipitator 60. The fresh air is sucked in by means of a suction fan 61 arranged downstream. The exhaust gas-cooling air mixture is separated via an exhaust 62, while the precipitated coolant water is returned to the storage vessel 20.

When the piston 4 has reached its top dead center, a working stroke of the internal combustion engine is concluded and the combustion chambers 1, 1' are filled with precompressed fresh air. Depending on the instantaneous output requirement, the next working stroke of the internal combustion engine can either be initiated (by injection of fuel into the combustion chambers 1, 1') in that the combustion has concluded at a time at which the thrust member 30 has just reached the next first running surface 39, 39' or a stroke pause of varying length can be inserted. During this stroke pause, the piston 4 of the expansion chamber remains at its top dead center and the thrust element 30 is lifted from the cam disk 31, while the cams 38 of the cam disk move past the thrust element 30 freely below the latter. The next working stroke of the internal combustion engine is introduced by injecting fuel into the combustion chambers 1, 1' at a time when the thrust element 30 is located exactly at the start of a first running surface 39, 39' of the cam disk 31 at the conclusion of combustion when the combustion chamber outlet valves 2, 2' are opened.

After the internal combustion engine has been stationary for a longer period of time, the above-atmospheric pressure of the fresh air located in the combustion chambers 1, 1' has evaporated (due to persistent leakage in the valves). In this case, before starting the engine, a precompression of fresh air in the combustion chambers 1, 1' is carried out by the pump 64 driven by the motor 63 via lines with check valves 66, 66'. Further, the motor 41 brings the cam disk 31 into the correct position in which the roller 33 is located at the start of a first running surface 39, 39'. Subsequently, fuel is injected into the combustion chambers and the mixture is ignited by the spark plugs 13, 13'.

Figure 6:
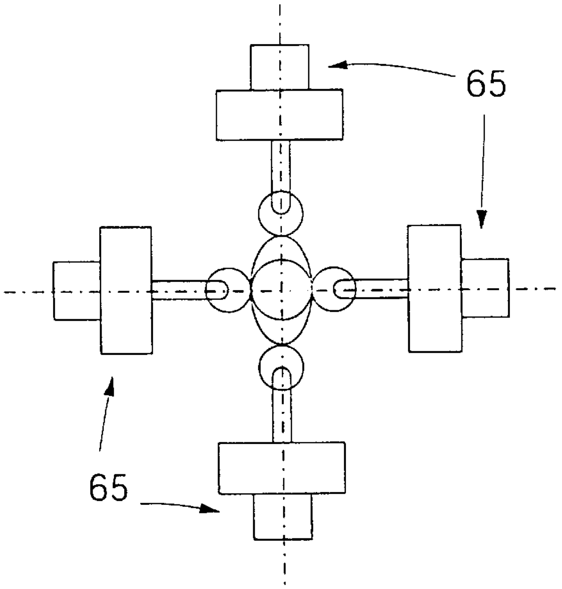
FIG. 6 shows a schematic view of an embodiment form in which a plurality of units, each with an expansion chamber and a connecting rod, act on a shared cam disk.

Instead of an individual unit 65 comprising the combustion chambers 1, 1', expansion chamber 3 with piston 4, precompressor device and thrust element 30, it is also possible to provide two or more units of this kind which are controlled in a corresponding relationship to one another and act on the same cam disk or on a plurality of cam disks 31. For vibration-free running, units of this type are advantageously provided in pairs so as to work in opposite directions. Gas movements and mass movements accordingly cancel each other out. FIG. 6 shows a schematic view of an embodiment example in which four such units 65 act on an individual cam disk.

In the embodiment example shown in the drawing, the cam disk 31 has two cams 38. In principle, it would also be conceivable and possible to provide one cam 38 or more than two cams 38 of this kind.

In the shown embodiment example, the piston rod 18 is oriented at right angles to the drive shaft 32, In principle, it would also be conceivable and possible to provide the piston rod 18 and drive shaft 32 with a parallel orientation and to provide the drive shaft 32 with a cam disk which is formed for a thrust element acting in axial direction of the drive shaft 32.

While the foregoing description and drawings represent the present invention, it will be obvious to those skilled in the art that various changes may be made without departing from the true spirit and scope of the present invention.

REFERENCE NUMBERS

1, 1' combustion chamber
2, 2' combustion chamber outlet valve
3 expansion chamber
4 piston
5 piston-cylinder unit
6 thermal insulation
7 wall
8, 8' double nozzle
9 switching valve
10 pressure accumulator
11 fuel pump
12 tank
—13' spark plug
14 cylinder head
15 insulation
16 cylinder wall
17 piston seal
18 piston rod
19 pump
20 storage vessel
21 valve
22 spray head
23 air intake funnel
24 piston
25 piston-cylinder unit
26 check valve
27 throttle
28 actuating motor
29, 29' check valve
30 thrust member
31 cam disk
32 drive shaft
33 roller
34 rolling bearing
35 plastic seal
37 plastic seal
38 cam
39, 39' first running surface
40, 40' second running surface
41 electric motor
42 coolant water injection nozzle
43 valve
44 pump
45 pressure accumulator
47 water collecting groove
48 spring
49 area
50 expansion chamber outlet valve
51 ring
52 restoring spring
53 outlet channel
54 hydraulic cylinder
55 tappet
56 O-ring
57 O-ring
58 O-ring
59 exhaust line
60 precipitator
61 suction fan
62 exhaust
63 motor
64 pump
65 unit
66, 66' check valve
67 seal

What is claimed is:

1. An internal combustion engine comprising:

at least one combustion chamber for burning a fuel in timed explosions accompanied by formation of a combustion gas;

at least one expansion chamber which is connected with the combustion chamber and separate from the combustion chamber and which has a piston for converting energy of the combustion gas into mechanical energy or work; and a cam gear unit by which a drive shaft is driven by the piston and which has a cam disk and associated thrust member, the thrust member being lifted from the cam disk;

wherein when stroke pauses without ignition of fuel in the combustion chamber are inserted depending on the instantaneous output requirement, the piston of the expansion chamber remains at a top dead center and the thrust member of the cam gear unit remains lifted from the cam disk of the cam gear unit and the cam disk rotates past the thrust member in an unimpeded manner.

2. The internal combustion engine according to claim 1, wherein the thrust member of the cam gear unit which acts on a cam disk arranged at the drive shaft is formed by the free end of the piston rod of the piston of the expansion chamber or by a part attached thereto and is constructed as a roller tappet.

3. The internal combustion engine according to claim 1, wherein the cam disk of the cam gear unit has two cams along its circumference.

4. The internal combustion engine according to claim 1, wherein a precompressor device which is separated from the combustion chamber is provided for precompression of air to be introduced into the combustion chamber.

5. The internal combustion engine according to claim 4, wherein the precompressor device is formed by at least one piston-cylinder unit whose piston communicates mechanically with piston of the expansion chamber and can be driven by a force acting on the piston of the expansion chamber.

6. The internal combustion engine according to claim 5, wherein the piston of the precompressor device is pretensioned by a spring in the position of the top dead center.

7. The internal combustion engine according to claim 1, wherein at least one injection nozzle opening into the expansion chamber is provided for injecting a coolant liquid to introduce an implosion stroke following the explosion stroke, which injection nozzle is preferably arranged in the shared piston rod of the piston of the expansion chamber and of the piston of the precompressor device.

8. The internal combustion engine according to claim 1, wherein the piston rod of the piston of the expansion chamber is mounted via a rolling bearing.

9. The internal combustion engine according to claim 1, wherein the cam disk has a first running surface extending over 40° to 70° of the circumference of the cam disk for driving the cam disk by the thrust member.

10. The internal combustion engine according to claim 9, wherein the cam disk has a second running surface for restoring the piston of the expansion chamber to the top dead center, which second running surface extends over 50° to 140°.

11. The internal combustion engine according to claim 9, wherein the cam disk has a second running surface for restoring the piston of the expansion chamber to the top dead center, which second running surface extends over 50° to 80°.

12. The internal combustion engine according to claim 10, wherein the first running surface is constructed more steeply than the second running surface.

13. The internal combustion engine according to claim 1, wherein the cam disk has an area with a constant radius in which the piston is located at its top dead center, wherein the length of this area corresponds at least to the time required for the complete burnup of the mixture in the combustion chamber at maximum rotational speed of the engine.

14. The internal combustion engine according to claim 1, wherein a plurality of pistons are mounted in expansion chambers and act on the same cam disk or on different cam disks arranged at the same drive shaft.

15. The internal combustion engine according to claim 14, wherein pistons are provided in pairs so as to work in opposite directions.

16. A method for operating an internal combustion engine, including the steps of:

burning a fuel in at least one combustion chamber in timed explosions accompanied by formation of a combustion gas;

letting the combustion gas expand into an expansion chamber that is separate from the combustion chamber, the combustion gas driving a piston in the combustion chamber, the piston driving a drive shaft by a cam gear unit that includes a cam disk and associated thrust member, the thrust member being lifted from the cam disk; and inserting stroke pauses without ignition of fuel in the combustion chamber, wherein during the stroke pauses the piston of the expansion chamber remains at a top dead center and the thrust member of the cam gear unit remains lifted from the cam disk of the cam gear unit and the cam disk rotates past the thrust member in an unimpeded manner.

17. The method according to claim 16, wherein identical amounts of fuel are introduced into the combustion chamber for carrying out individual explosion strokes.

18. The method according to claim 16, wherein the fuel in the combustion chamber is ignited at a time such that, after the fuel in the combustion chamber is completely burned up, the cam disk is disposed at the precise angular position suitable for the driving of the cam disk by the thrust member, whereupon a combustion chamber outlet valve is opened.

19. The method according to claim 16, wherein the the combustion chamber outlet valve is opened in a delayed manner at the start of the expansion stroke of the piston, wherein the combustion gas flows out of the combustion chamber into the expansion chamber in throttled manner.

20. An internal combustion engine comprising:

at least one combustion chamber for burning a fuel in timed explosions accompanied by formation of a combustion gas;

at least one expansion chamber which is connected with the combustion chamber and separate from the combustion chamber and which has a piston for converting energy of the combustion gas into mechanical energy or work; and a cam gear unit by which a drive shaft is driven by the piston and which has a cam disk and associated thrust member;

said thrust member being lifted from the cam disk for implementing irregular engine cycles independent from a continuous rotation of the cam disk, including a pausing of the piston of the expansion chamber at a top dead center;

wherein a precompressor device which is separated from the combustion chamber is provided for precompression of air to be introduced into the combustion chamber.

21. The internal combustion engine according to claim 20, wherein the precompressor device is formed by at least one piston-cylinder unit whose piston communicates mechanically with piston of the expansion chamber and is driven by a force acting on the piston of the expansion chamber.

22. The internal combustion engine according to claim 21, wherein the piston of the precompressor device is pretensioned by a spring in the position of the top dead center.

23. An internal combustion engine comprising:

at least one combustion chamber for burning a fuel in timed explosions accompanied by formation of a combustion gas;

at least one expansion chamber which is connected with the combustion chamber and separate from the combustion chamber and which has a piston for converting energy of the combustion gas into mechanical energy or work; and a cam gear unit by which a drive shaft is driven by the piston and which has a cam disk and associated thrust member;

said thrust member being lifted from the cam disk for implementing irregular engine cycles independent from a continuous rotation of the cam disk, including a pausing of the piston of the expansion chamber at a top dead center;

wherein at least one injection nozzle opening into the expansion chamber is provided for injecting a coolant liquid to introduce an implosion stroke following the explosion stroke, which injection nozzle is preferably arranged in the shared piston rod of the piston of the expansion chamber and of the piston of the precompressor device.

24. An internal combustion engine comprising:

at least one combustion chamber for burning a fuel in timed explosions accompanied by formation of a combustion gas;

at least one expansion chamber which is connected with the combustion chamber and separate from the combustion chamber and which has a piston for converting energy of the combustion gas into mechanical energy or work; and a cam gear unit by which a drive shaft is driven by the piston and which has a cam disk and associated thrust member;

said thrust member being lifted from the cam disk for implementing irregular engine cycles independent from a continuous rotation of the cam disk, including a pausing of the piston of the expansion chamber at a top dead center;

wherein the piston rod of the piston of the expansion chamber is mounted via a rolling bearing.

25. An internal combustion engine comprising:

at least one combustion chamber for burning a fuel in timed explosions accompanied by formation of a combustion gas;

at least one expansion chamber which is connected with the combustion chamber and separate from the combustion chamber and which has a piston for converting energy of the combustion gas into mechanical energy or work; and a cam gear unit by which a drive shaft is driven by the piston and which has a cam disk and associated thrust member;

said thrust member being lifted from the cam disk for implementing irregular engine cycles independent from a continuous rotation of the cam disk, including a pausing of the piston of the expansion chamber at a top dead center;

wherein the cam disk has an area with a constant radius in which the piston is located at the top dead center, wherein the length of this area corresponds at least to the time required for the complete burnup of the mixture in the combustion chamber at maximum rotational speed of the engine.

26. A method for operating an in terminal combustion engine, including the steps of:

igniting fuel in a combustion chamber;

driving a drive shaft by a cam gear unit, the cam gear unit including a cam disk and a thrust member;

inserting idle strokes or stroke pauses without ignition of fuel in the combustion chamber, in which a piston of an expansion chamber remains at a top dead center and the thrust member of the cam gear unit remains lifted from the cam disk of the cam gear unit, such that the cam disk rotates past the thrust member in an unimpeded manner;

wherein the fuel in the combustion chamber is ignited at a time such that, after the fuel in the combustion chamber is completely burned up, the cam disk has the precise angular position suitable for the driving of the cam disk by the thrust member, whereupon a combustion chamber outlet valve is opened.

* * * * *